(12) United States Patent
Andermo

(10) Patent No.: US 6,242,906 B1
(45) Date of Patent: Jun. 5, 2001

(54) SYSTEMS AND METHODS FOR CALIBRATING AN ABSOLUTE POSITION ENCODER

(75) Inventor: Nils Ingvar Andermo, Kirkland, WA (US)

(73) Assignee: Mitutoyo Corporation, Kanagawa (JP)

(*) Notice: Subject to any disclaimer, the term of this patent is extended or adjusted under 35 U.S.C. 154(b) by 0 days.

(21) Appl. No.: 09/307,788

(22) Filed: May 10, 1999

(51) Int. Cl.[7] ............................. G01B 7/02; G01B 7/14; G01B 5/20; G01R 35/00
(52) U.S. Cl. ................ 324/202; 324/207.17; 324/207.12
(58) Field of Search ........................... 324/202, 207.17, 324/207.24, 207.12; 336/45, 130, 131; 340/870.32

(56) References Cited

U.S. PATENT DOCUMENTS 5,841,274  11/1998  Masreliez et al. .............. 324/207.17
5,886,519   3/1999  Masreliez et al. .............. 324/207.17

*Primary Examiner*—Jay Patidar
(74) *Attorney, Agent, or Firm*—Oliff & Berridge, PLC.

(57) ABSTRACT

Methods and systems for calibrating an absolute position encoder where a read head is moved relative to a scale of the absolute position encoder and the absolute position encoder is comprised of a fine scale and a coarse scale. An absolute position of a coarse scale is determined which corresponds to the measurement in a fine wavelength. An ideal coarse absolute position is determined from the fine scale measurements. A deviation between the determined coarse absolute position and the ideal coarse absolute position is then determined. The mean of the maximum positive and negative deviations from the ideal coarse scale absolute position for different intervals of the scale are then stored for the entirety of a measured range. These stored correction values are then used to correct the coarse scale values. The concept can be utilized also in a system with more than two wavelengths, for instance a fine wavelength, a medium wavelength and a coarse wavelength.

15 Claims, 7 Drawing Sheets

US 6,242,906 B1

SYSTEMS AND METHODS FOR CALIBRATING AN ABSOLUTE POSITION ENCODER

BACKGROUND OF THE INVENTION

1. Field of Invention

This invention is related to absolute position encoders. In particular, this invention is directed to systems and methods for spatially synchronizing coarse and fine resolution measurements in absolute position encoders.

2. Description of Related Art

Absolute position encoders, such as those disclosed in U.S. patent application Ser. No. 09/213,268 and U.S. Pat. No. 5,841,274, each incorporated herein by reference in its entirety, generally have two members movable relative to each other.

In the absolute position encoder disclosed in the 268 application, each transducer includes at least one transmitter winding and at least one receiver winding. In these transducers, the transmitter windings are inductively coupled to the receiver windings by the same plurality of coupling loops. In particular, in the 268 application, the first coupling loop portions 206 are arranged at a different wavelength than the second loop portions 208. Accordingly, depending on which transmitter winding is driven, the scale will couple to the receiver windings 224 or 226, respectively, at a different effective wavelength. Thus, depending on which transducer is being driven, a different fine wavelength measurement can be taken. By combining the phase position information obtained by driving the two transducers in sequence, a coarse wavelength position can be determined, as described in the 268 application.

The absolute position encoder disclosed in the 274 patent includes two or more position transducers. In the 274 patent, each position transducer includes at least one transmitter winding for generating a magnetic field and at least one receiver winding for receiving an associated magnetic field. Each position transducer also includes a plurality of flux modulators which modulate the magnetic field generated by the transmitter winding. Each receiver winding has a plurality of loops arranged along a measurement axis. The receiver windings of two of the position transducers define two wavelengths that are similar to each other, but not equal. Thus, a phase relationship between the outputs of the two position transducers has a coarse wavelength much longer than the wavelength of either of the two individual position transducers. Therefore, the absolute position between the two members can be determined over the range of the coarse wavelength.

Alternatively, the absolute position encoder can include only one fine wavelength position transducer. Such an absolute position encoder also includes one or more position transducers having coarser (longer) wavelength(s). The absolute position between the two members is determined by first identifying a coarse absolute position along the measuring axis using the coarse wavelength position transducer, and then refining this coarse position using information from the fine wavelength position transducer. A coarse wavelength transducer can be based, for example, on an analog scale, using a sine function or a triangular function, or a parallel or serial digital code track scale.

In some absolute position transducers, the coarse and fine scales need to be spatially synchronized or calibrated. This has been accomplished, for example, by placing the read head at one location somewhere on the scale and activating a command for spatially synchronizing the fine and coarse scales. The command is activated for instance by pressing a zero button for a long time (one second or more). When this is done, a value is stored in an electrically programmable memory, such as an EEPROM, that corresponds to the offset in the coarse wavelength position measurement relative to the fine wavelength position measurement at that particular location. This single offset is then used for the entirety of the scale.

SUMMARY OF THE INVENTION

This invention provides systems and methods that more precisely spatially synchronize fine and coarse wavelength transducer measurements in an absolute position transducer with two or more scales of different wavelengths.

While the above-outlined method proves successful for determining a gross calibration, suitable for compensating for read head misalignment, for example, the systems and methods of this invention reduce the sensitivity of the absolute measurement to the coarse error magnitude and thus increase the overall design margin, to allow a larger ratio between the coarse and fine wavelengths. This extends the possible absolute measuring range.

Specifically, a read head is moved relative to a scale of an absolute position encoder. The coarse position readings are compared to an ideal coarse position obtained from a set of fine wavelength position measurements. The deviation between the measured coarse position and the ideal coarse position is then determined. The maximum and minimum deviations from the ideal coarse position over selected intervals are extracted and the mean value of these are then stored for each selected interval over the measured range. This information is then used to calibrate or spatially synchronize the coarse position readings with the fine wavelength readings of the absolute position transducer.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

While the methods and systems of this invention will be described in relation to an inductive absolute position encoder embodiment, one of ordinary skill in the art should appreciate that the methods and systems of this invention will work equally well for capacitive and optical absolute position encoders based on fine and coarse wavelength measurements. In general, any position encoder that relies on the relationship between at least two wavelengths to determine an absolute position can use the calibration systems and methods of this invention.

One way of creating a coarse wavelength is to have two fine scales with slightly different wavelengths. The coarse wavelength is created by taking the phase difference between the two fine wavelengths. For example, if the two fine wavelengths have the following wavelengths and phase angles:

| | | | |
|---|---|---|---|
| Fine 1: | λ = 5.4 mm. | Phase angle 1: | $\Phi_1 = x/\lambda_1 - INT(x/\lambda_1)$; and |
| Fine 2: | λ = 5.268 mm | Phase angle 2: | $\Phi_2 = x/\lambda_2 - INT(x/\lambda_2)$, | where the phase angle unit is normalized to express the fraction of wavelength that the movement x represents, i.e., where a phase angle value of 1 corresponds to 360 degrees or 2π radians. Then, measuring the phase difference $\Phi_c$ between the two scales is:

$$\Phi_c = (\Phi_2 - \Phi_1) - INT(101_2 - \Phi_1) = x/\lambda_2 - x/\lambda_1 = x/[\lambda_1\lambda_2/(\lambda_1-\lambda_2)] = x/215.5 \quad (1)$$

Therefore, the coarse wavelength phase $\Phi_c$ goes through the same range of values for a distance of 215.5 millimeters as one of the fine wavelength phases $\Phi_1$ or $\Phi_2$ goes through for a distance of its respective wavelength. Thus $\Phi_c$ represents a coarse wavelength of 215.5 mm.

The "-$INT_0$" function above represents the rollover that occurs in phase measurement after one full wavelength. Specifically, after one full wavelength, the phase starts over from zero again. For example, for Eq. 1, which defines the coarse phase angle $\Phi_c$, the expression without the -$INT_0$ function would have intervals with negative values. The -$INT_0$ function shifts these intervals up one unit to yield a positive phase function $\Phi_c$.

Figure 1:
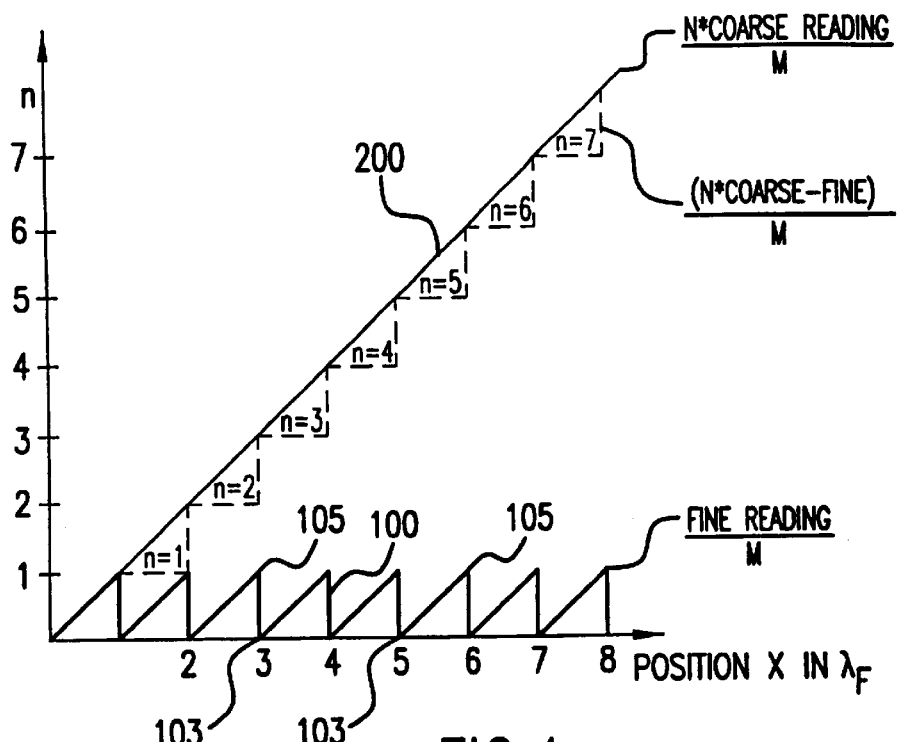
FIG. 1 illustrates the relationship between an ideal coarse wavelength output and an ideal fine wavelength output in an exemplary absolute position encoder.

FIG. 1 illustrates the ideal phase function 100 for an exemplary absolute position encoder having a fine wavelength $\lambda_1$ and the ideal phase function 200 for a coarse wavelength $\lambda_c = N^*\lambda_1$. The fine and coarse wavelengths correspond to the measurements obtained when a read head is moved relative to a scale. The phase position 100 of the ideal fine wavelength $\lambda_1$ repeats itself in a saw-tooth manner for N number of iterations over the coarse wavelength $\lambda_c$. An absolute position for the read head of the absolute position encoder relative to the scale can be determined by the coarse wavelength measurement to within a fraction of each fine wavelength. In particular, the values for the coarse wavelength measurement are used to identify the wavelength number for the corresponding fine wavelength.

The phase position 100 of the ideal fine wavelength $\lambda_1$ rises linearly with position until the read head has traveled a full fine wavelength relative to the scale. Then, the phase position 100 of the ideal fine wavelength $\lambda_1$ returns to 0 and begins rising again. The phase position 100 forms the illustrated saw-tooth pattern with values that repeatedly rise from 0 (0°), at the valley 103, to 1 (corresponding to 360°), at the peaks 105, as the read head traverses the scale over the fine wavelengths. The phase position of the ideal coarse wavelength theoretically also rises linearly from 0 (0°) to 1 (360°) as the read head moves relative to the scale over the coarse wavelength. Multiplying the coarse phase with N gives a function 200 with same slope as the fine phase function 100.

It should be appreciated that, in a three-scale embodiment, such as that shown in the incorporated 274 patent, the absolute position transducer will also have a medium wavelength. The medium wavelength extends over a multiple of the fine wavelengths, but is a fraction of the coarse wavelength. Thus, the coarse wavelength identifies a particular medium wavelength, while the medium wavelength identifies a particular fine wavelength.

In practice, knowing the phase position of a read head within a coarse wavelength to a first resolution, the absolute position of the encoder is next determined to a second higher resolution by identifying the fine wavelength corresponding to that coarse phase position of the read head. Therefore, to determine which fine scale wavelength corresponds to the coarse wavelength reading, the corresponding fine wavelength number (n) is:

$$n = INT(N^*\Phi_c - \Phi_1 + 0.5) \quad (2)$$

where:

N is the ratio of the coarse wavelength to the fine wavelength, $\Phi_c$ is the actual coarse wavelength phase position;

$\Phi_c$ is the actual fine wavelength phase position; and

INT(. . .) is the integer part of the value of the expression in the parenthesis.

Therefore, n provides the fine wavelength number. As long as the coarse wavelength reading is accurate relative to the ideal coarse function to within ±½ fine wavelength, this method of obtaining n corresponds to a staircase function that is perfectly synchronized with the saw-tooth transitions of the fine phase function that corresponds to the fine wavelength phase position 100. Since the fine wavelength phase position 100 corresponds to the fine phase function 100, the effect of the saw-tooth transitions of the fine phase function are included in the expression.

Thus, the absolute position ($P_A$) of the read head relative to the scale is:

$$P_A = \pi_1^*(n + \Phi_1) \quad (3)$$

where $\lambda_f$ is the wavelength of the fine wavelength.

Figure 2:
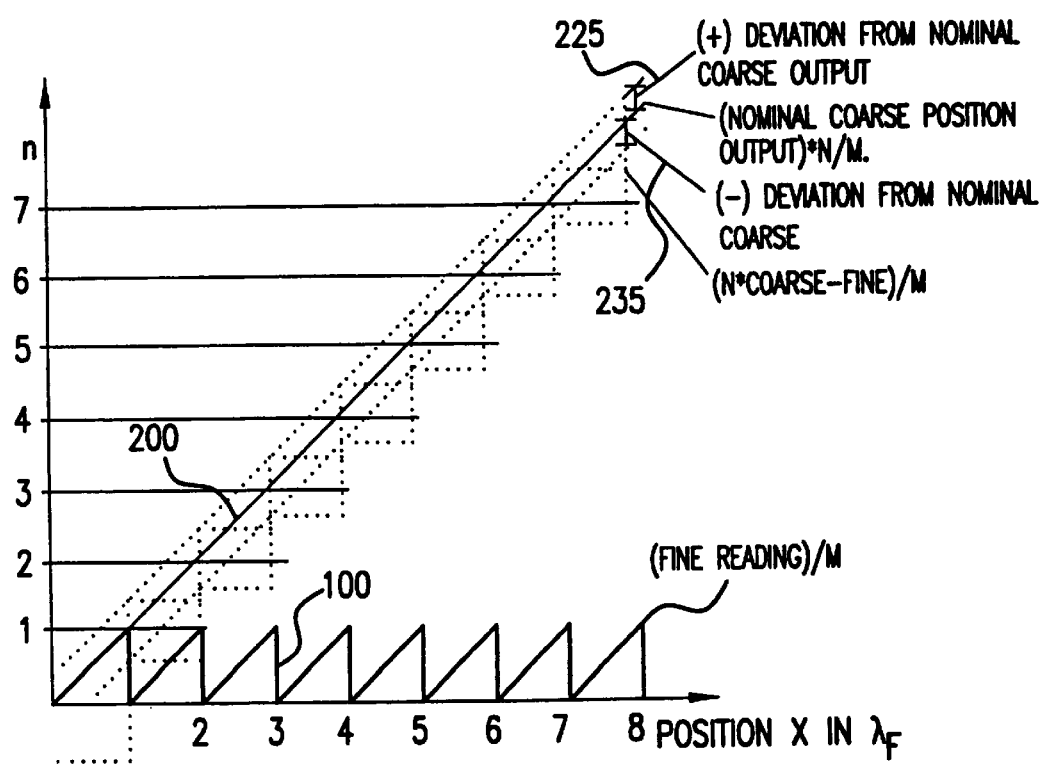
FIG. 2 illustrates the relationship between the ideal coarse wavelength output and the ideal fine wavelength output when an error is introduce in the exemplary absolute position encoder.

However, as illustrated in FIG. 2, if the coarse phase function has an error, the determined value for the fine wavelength number n may deviate from the true fine wavelength number by an amount that corresponds to the coarse phase function error. This amount of coarse phase function error can be expressed in fine wavelengths. If the coarse phase function error is less than one-half of a fine wavelength, it is still possible to determine the correct fine wavelength by appropriate rounding of the determined value for the fine wavelength number n according to equation (2). Therefore, the absolute limit for acceptable coarse phase function error is plus or minus one-half of the fine wavelength $\lambda_f$.

FIG. 2 illustrates the effect of a coarse scale phase error having a magnitude slightly less than $+/-\lambda_f/2$. In particular, the positive deviation 225 from the ideal coarse phase function 200 is shown above the ideal coarse phase function 200, and the negative deviation 235 from the ideal coarse phase function 200 is shown below the ideal coarse phase function 200. If the coarse phase function error is greater than $+/-\lambda_f/2$, Eq. (2) will incorrectly determine the number n. Therefore, to allow an adequate safety margin, the coarse scale phase error of the absolute position encoder should not exceed plus or minus one-quarter of the fine wavelength $\lambda_f$. That is, an accuracy better than plus or minus one-quarter of the fine wavelength $\lambda_f$ will ensure the correct fine wavelength number is determined from the measured coarse phase position with a good design margin.

Figure 3:
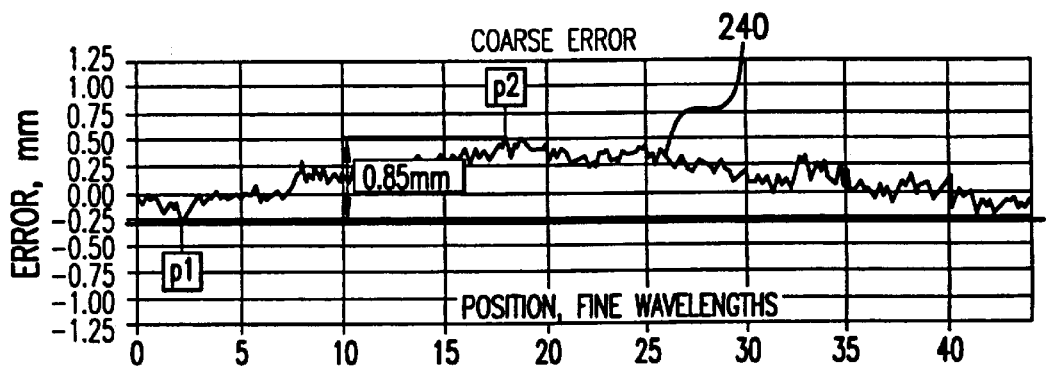
FIG. 3 illustrates a typical coarse error curve for an exemplary absolute position encoder.

FIG. 3 illustrates a typical coarse position error curve 240 that may be encountered in a real-life situation. To compensate for this coarse position error, conventional absolute encoders synchronize the coarse and fine wavelengths, that is, calibrate the coarse wavelength to determine and compensate for the coarse wavelength error. For example, a user will place the read head of the absolute position encoder somewhere on the scale. At this point, the user will press a zero button and the offset between fine and coarse readings will be recorded in a memory and thereafter used for spatially synchronizing the coarse measurement and the fine measurement. For example, if the zero-setting is done at the point p1, the maximum error when traversing the scale will be at the point p2, with a magnitude of 0.85 millimeters. Alternatively, if the zero-setting should occur at the point p2, then the maximum error will occur at the point p1, with a magnitude of –0.85 millimeters. Therefore, the total coarse position error could be anywhere between zero and 0.85 millimeters depending on the position at which the zero-setting occurred.

For example, one exemplary embodiment of an absolute position encoder may have a fine wavelength $\lambda_f$ of 5.4 millimeters and a coarse wavelength $\lambda_c$ of 216 (=40×5.4) millimeters. Thus, N is 40. As previously noted, in order for the absolute position encoder to correctly identify which fine wavelength corresponds to the measured coarse wavelength position, the coarse scale measurement should have an error range of less than +/– one-quarter of the fine wavelength $\lambda_F$. Therefore, in this illustrative example, the coarse wavelength error should be less than +/–5.4 mm/4, or +/–1.35 millimeters. As shown in FIG. 3, the exemplary coarse position error curve 240 would be within the desired tolerance limit. It should thus be appreciated that, by reducing the coarse wavelength error, a smaller fine wavelength can be used while remaining within the quarter-wavelength unit on the coarse wavelength error. This allows the ratio between the coarse and fine wavelengths to be increased, to provide a same-length coarse wavelength and a finer fine wavelength or a same-wavelength fine wavelength and a longer coarse wavelength, or a combination of both.

Figure 4:
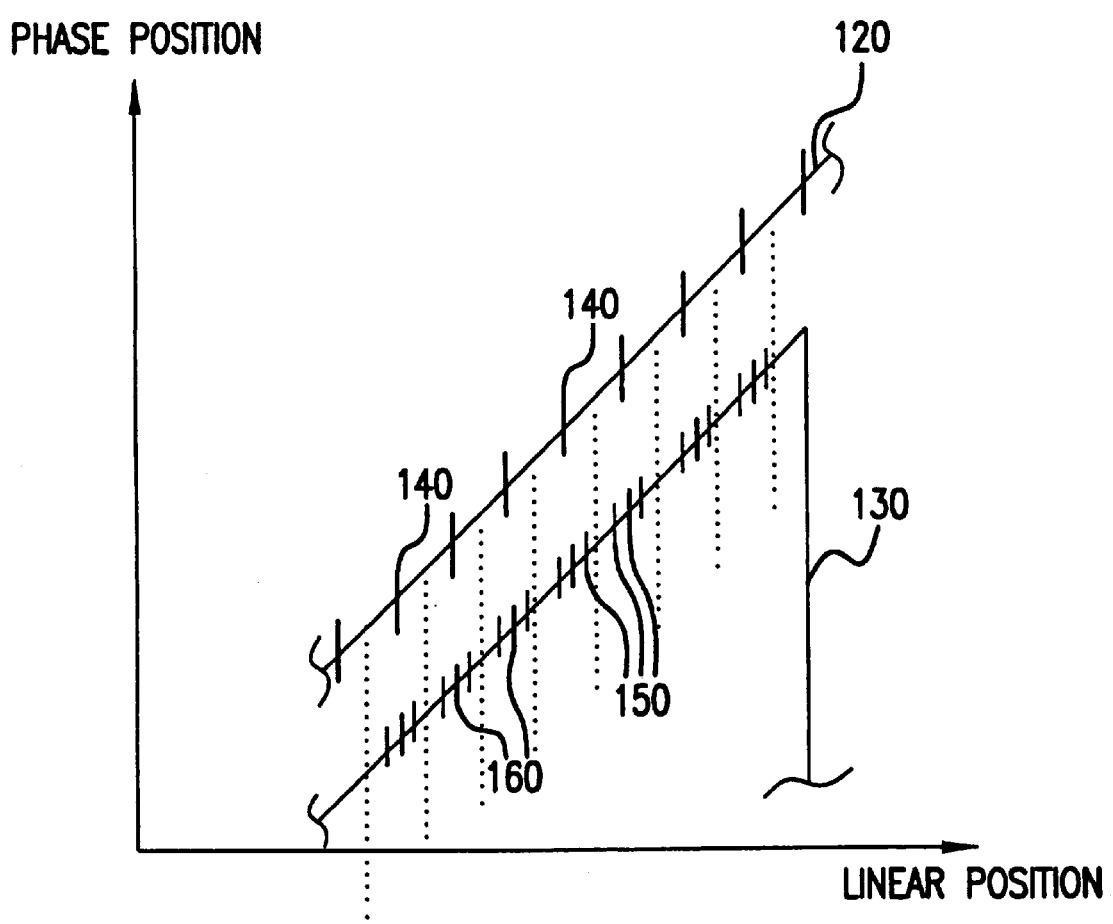
FIG. 4 illustrates in greater detail the relationship between the coarse wavelength output and the fine wavelength output.

FIG. 4 shows an enlarged view of an exemplary signal received from the transducer signal generating and processing circuitry of the absolute position encoder. Specifically, the generated signals include a coarse wavelength phase position 120, an actual fine wavelength phase position 130, a plurality of coarse resolution absolute position measurements 140, a plurality of fine wavelength sampling points 150, at which the actual fine wavelength phase position measurements are taken, and a plurality of average fine wavelength phase position measurements 160.

While the fine wavelength sampling points 150 are shown evenly distributed along the actual fine wavelength phase position curve 130, it should be appreciated that the fine wavelength sampling points 150 could also be randomly distributed. Furthermore, it should be appreciated that the sampling frequency can be adjusted to correspond to the type of absolute position encoder the system is incorporated into. For example, a caliper may be calibrated with position samples of fine and coarse readings occurring at a frequency of 10 times per second while the read head is moved over the scale manually, resulting in randomly distributed sampling points. Alternatively, a linear scale with motion control will have more evenly distributed sampling points occurring at a frequency of, for example, 10,000 times per second and the read head being moved at a constant speed controlled by the motion control system.

Nevertheless, for the calibration systems and method according to this invention, the resolution of the calibration is limited by the interpolation rate of the actual coarse wavelength. Accordingly, there may be several fine wavelength sampling points 150 that correspond to a particular coarse resolution absolute position measurement 140. Therefore, if more than one fine wavelength sampling point 150 corresponds to particular coarse resolution absolute position measurement 140, an average of the fine wavelength sampling points, i.e., the average fine wavelength phase position measurement 160, can be used to represent the actual fine wavelength phase measurement. However, it should be apparent to one of ordinary skill in the art that any averaging technique and any one or number of fine wavelength sampling points 150 can be selected to indicate the actual fine wavelength phase position measurement corresponding to a coarse resolution absolute position measurement.

For the calibration systems and methods according to this invention, it will be assumed that there is only one fine wavelength phase position measurement per coarse wavelength interpolation value 140, which is based on either a single fine wavelength sampling point 150 or the average fine wavelength phase position measurement 160.

Figure 5:
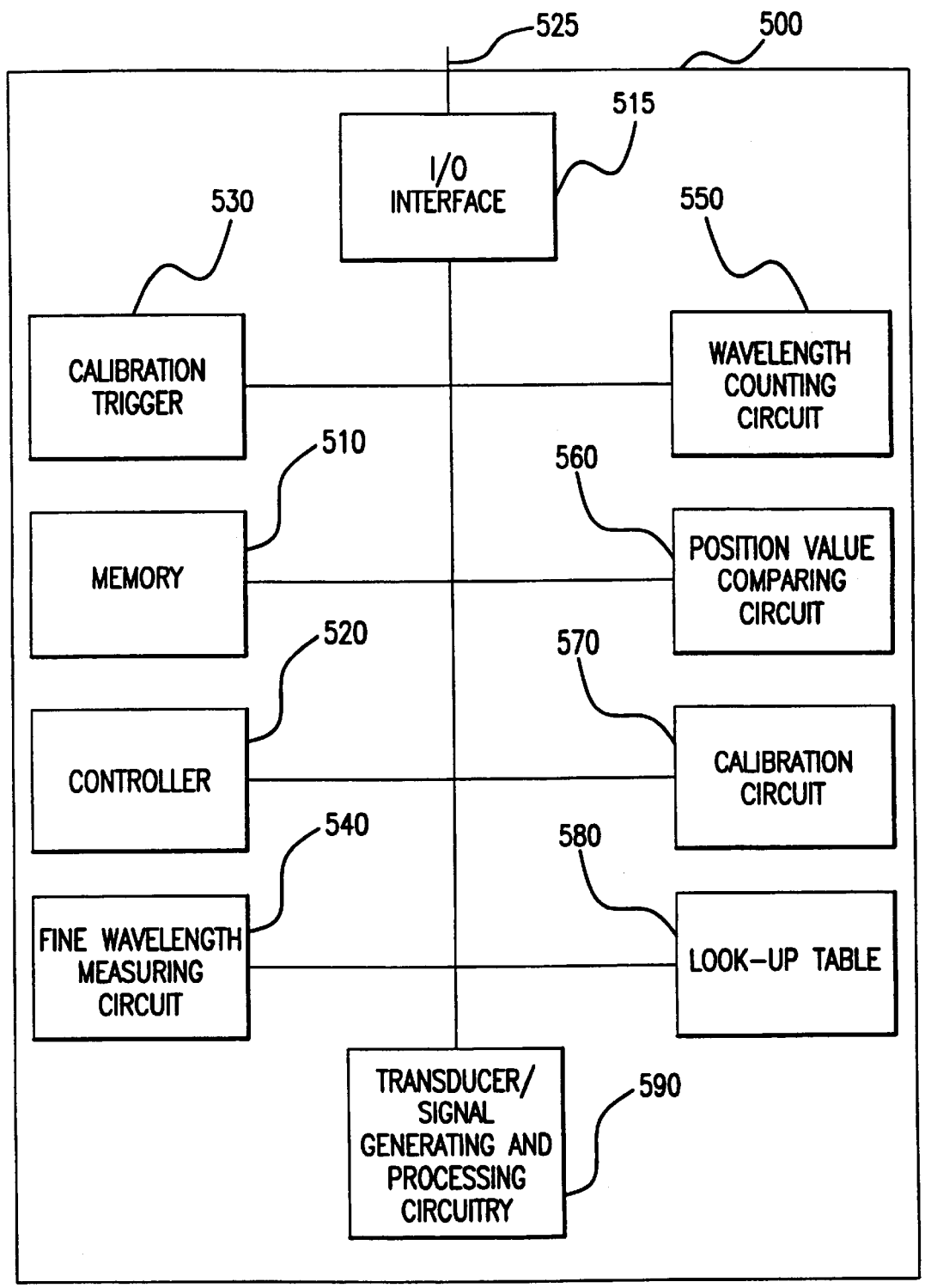
FIG. 5 is a functional block diagram illustrating one exemplary embodiment of an absolute position encoder calibration system according to this invention.

FIG. 5 illustrates the absolute position encoder 500 according to this invention. Specifically, the absolute position encoder 500 comprises a memory 510, a controller 520, an I/O interface 515, a calibration trigger 530, a fine wavelength measuring circuit 540, a wavelength counting circuit 550, a position value comparing circuit 560, a calibration circuit 570, a look-up table 580, a transducer/signal generating and processing circuit 590 and a data link 525, for connecting the encoder to, for example, an external display, all interconnected via data bus/link 525.

The calibration trigger 530, such as a button or switch, is incorporated into the absolute position encoder 500 and initiates the calibration process in accordance with this invention. As this calibration process involves not only electronic and computer activities, but also a physical movement of the encoder read head along the scale, the calibration trigger should not be easily or accidentally activated. Normally the calibration process should be done in conjunction with the final assembly of the encoder and then activated with a hidden switch or a specific command from outside. It could also be done by for instance holding down the zero button on a caliper over several seconds or some combination of more than one of the caliper's control buttons. In general, the calibration trigger 530 can be designed in any matter that allows the calibration process in accordance with this invention to be performed.

The transducer signal generating and processing circuitry 590, under control of the controller 520, generates the actual output signals from the transducer and converts the transducer output signals to an actual fine wavelength phase position measurement and an actual coarse wavelength phase position measurement. For example, the transducer signal generating and processing circuitry 590 could be the receiver signal processing circuit 242, the transmitter drive signal generator 220 and the control unit 244 disclosed in U.S. patent application Ser. No. 09/213,268, or the transducer signal generating and processing circuit disclosed in U.S. Pat. No. 5,886,519, each incorporated herein by reference in their entirety.

Therefore, the transducer signal generating and processing circuitry 590 can be any circuit capable of outputting a digital signal indicative of the coarse and fine wavelength phase positions of the read head relative to the scale.

Therefore, the calibration process commences when the calibration trigger 530 is activated. After activation, the read head is moved relative to the scale over the entirety of the scale. However, it should be appreciated that the calibration can also be performed only over some portion of the scale. As the read head is moved relative to the scale over the desired range of calibration, the fine wavelength measuring circuit 540 monitors the fine wavelength phase position measurements generated by the transducer signal generating and processing circuitry 590. Then, each time the phase value of the fine scale is passes a transition from a maximum phase position 1 to a minimum phase position 0, the wavelength counter will increment by one. Each time the phase value of the fine scale passes a transition from a minimum phase position 0 to maximum phase position 1, the wavelength counter will decrement by one. The wavelength counter value $n_f$ together with the fine scale phase reading, will form a value for position that is the ideal reference for the coarse resolution absolute position:

$$P_{CI} = \pi_f^* (n_f + \Phi_f) \tag{4}$$

At the same time, the fine wavelength measuring circuit monitors the received average fine wavelength phase position measurement 160 that corresponds to the actual fine wavelength phase position measurements for the sampling points 150 that correspond to a current coarse wavelength interpolation value 140. The controller 520 then determines the actual coarse resolution absolute position, corresponding to the coarse wavelength phase position measurement. The position value comparing circuit 560 compares the actual coarse resolution absolute position and the ideal coarse resolution absolute position to determine a position difference or error. As each ideal coarse resolution absolute position is compared to the corresponding actual coarse resolution absolute position, the position value comparing circuit 560 records the position difference as an error. This error will be a function of the position along the scale and could be stored in look-up table 580 for each measuring point and then used for correcting the actual coarse position measurement before calculating the fine scale n-value in equation (3). In order to limit the size of the look-up table 580 it is better to divide the scale into a number of intervals and over each interval the maximum and minimum error is recorded, whereafter the mean of maximum and minimum error is stored in the look-up table 580 for each interval.

As the read head is moved relative to the scale within the current portion, new error values are determined corresponding to each coarse resolution absolute position. Each determined error value is then compared to the stored maximum and minimum error values. If the current error magnitude is greater than the stored maximum error, the current error magnitude is stored as the maximum error. However, if the current error magnitude is not greater than the stored maximum upper error, the current error magnitude is compared to the minimum error. If the current error magnitude is less than the stored minimum error, the current error magnitude is stored as the minimum error. This process continues until the end of the current interval is reached. Once the end of the current interval is reached, the position value comparing circuit 560 has stored in memory the maximum and minimum lower error values for that portion.

The position value comparing circuit 560 monitors and stores in the look-up table 580 the mean of these maximum and minimum deviation values for each calibration interval or calibration portion. The length of the calibration intervals is defined in the calibration program to be either the entire range of the absolute position encoder 500 or some portion of the range of the absolute position encoder 500. That is, the absolute position encoder 500 can use a single calibration value for its entire range, or can use a different set of calibration values for each of a plurality of portions, such as a fine wavelength, of the entire range. In any case, whether a set of calibration values represents the entire range or only a portion of the range, the calibration values are, in one exemplary embodiment, the mean of the minimum and maximum error values for the corresponding portion. During normal measurement, the calibration circuit 570 then retrieves the stored mean of maximum and minimum error values from the look-up table 580 and makes a correction of the actual coarse position values for measuring points within each interval. The corrected coarse position will be closer to the ideal coarse position and provide for an improved calculation of the wavelength number for the fine scale.

The links 505 and 525 can be any wired or wireless link, or any known element that is capable of supplying electronic data to and from the connected elements.

Figure 6:
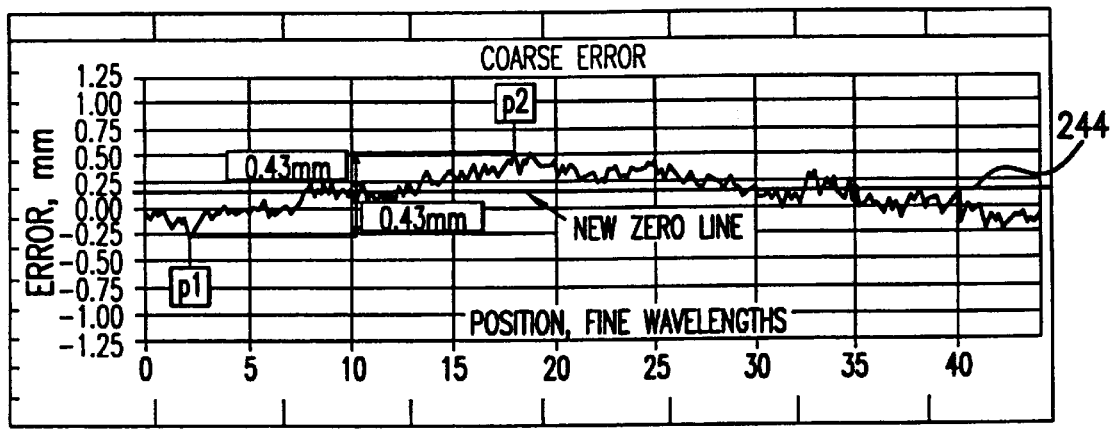
FIG. 6 is a graph illustrating the new zero line in accordance with the calibration methods and systems of this invention.
Figure 7:
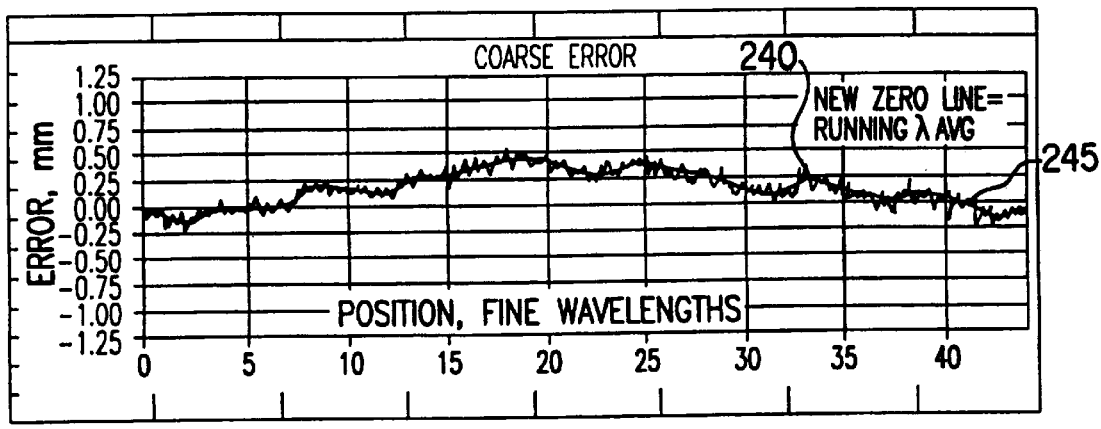
FIG. 7 is graph illustrating a once per fine wavelength superimposed calibration curve in accordance with the calibration methods and systems of this invention.
Figure 8:
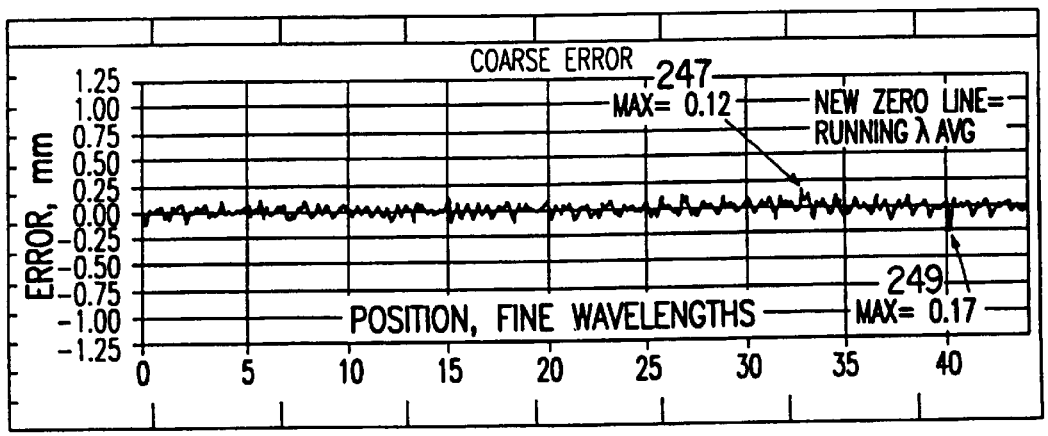
FIG. 8 is graph of the difference between the full error curve and the running once per wavelength calibration function shown in FIG. 7.

FIGS. 6, 7, and 8 shows how the coarse calibration systems and methods of this invention improve the coarse wavelength error margin compared with FIG. 3. In FIG. 6, there is only one calibration portion, which extends over the entire range of the absolute position encoder 500. Thus, only one calibration value corresponding to the mean value of the absolute maximum and absolute minimum error values over the entire range has been stored and used to determine the new zero line 244. Specifically, the new zero line 244 now bisects the absolute minimum error p1 and the absolute maximum error p2. Therefore, in this illustrative example, the maximum coarse position error has been reduced to 0.43 millimeters, one half of the maximum error of ±0.86 mm that could occur in a conventional system. While the above described process establishes a new zero line 244 based on the absolute maximum error p1 and the absolute minimum error p2 over the entire range of the scale, the methods and systems of this invention will give greater improvement of the coarse accuracy if the scale is divided into several smaller intervals and correction values are stored and utilized for each interval.

FIG. 7 illustrates how the zero line 245 may appear if the calibration process determines a new zero line, for example, once per fine wavelength. Stated another way, FIG. 7 shows a new zero line 245 overlaying the coarse position error curve 240 that is calculated over a range, or portion, of one fine wavelength. Therefore, in this example, the correction value was independently determined for each new fine wavelength. Therefore, when compared with FIG. 5, the accuracy has been improved even further. However, it should be appreciated that a maximum accuracy is reached if the calibration interval is chosen to be equal to the resolution interval of the coarse measurement. However, a density of calibration points greater than once per fine wavelength generally provides a very small additional improvement.

FIG. 8 illustrates the error between the error curve and the once-per-fine-wavelength zero line shown in FIG. 7. Specifically, FIG. 8 illustrates the error range that remains after calibration, i.e., the error range that must be used when determining if the coarse wavelength phase position measurement is within a quarter fine wavelength. As shown in FIG. 8, the absolute maximum error 247 is 0.12 and the absolute minimum error 249 is −0.17 millimeters for an error range of 0.29 mm. Thus, so long as the fine wavelength is at least equal to 4*0.17 mm or 0.68 mm, assuming that the shorter fine wavelength does not degrade the coarse error function, the coarse wavelength phase position measurement can be used to correctly identify the proper fine wavelength. Clearly, the accuracy is greatly improved over the original zero line illustrated in FIG. 3.

Establishing a new zero line in this manner exceeds the accuracy needed for the previously described hypothetical absolute position encoder. Thus, the calibration process according to this invention allows absolute position encoders to be designed with shorter fine wavelengths or longer coarse wavelength, or with higher ratios between the coarse and fine wavelengths. That is, using the exemplary error curves of FIGS. 6, 7 and 8, an absolute position encoder could be modified to use either a shorter fine wavelength or a longer coarse wavelength.

For example, if the coarse wavelength is functionally separate from the fine wavelength, the fine wavelength could be reduced to a much shorter wavelength, with the limiting requirement being that the coarse wavelength error must remain less than $\lambda_F/4$ for an adequate safety margin. With the illustrated coarse wavelength error functions, the fine wavelength of the absolute position encoder could be reduced as follows:

Conventional calibration method

| | |
|---|---|
| as shown in FIG. 1 | 4*0.85 = 3.4 mm |
| Method 1 | 4*0.425 = 1.7 mm |
| Method 2 | 4*0.17 = 0.68 mm | where:

Method 1 averages the maximum and minimum error over the entirety of the scale; and Method 2 divides the scale into several intervals and performs the calibration procedure for each interval separately. The length of the intervals can be adapted to the character of the original coarse error function relative to the cumulative fine scale measurement. The advantage of a shorter fine wavelength would be a lower required interpolation rate for a given resolution, or alternatively, a better resolution for a given interpolation rate.

Alternatively, the increased coarse wavelength error margin can be utilized for making a longer coarse wavelength. Hypothetically, in the above example based on a fine wavelength of 5.4 mm and a coarse wavelength of 215 mm, a full utilization of the error margin would make possible the following increased coarse wavelengths:

Conventional calibration method

| | |
|---|---|
| as shown in FIG. 1 | 215*1.35/.85 = 341 mm |
| Method 1 | 215*1.35/0.425 = 683 mm |
| Method 2 | 215*1.35/0.17 = 1707 mm | where 1.35 is the allowed coarse error for 5.4 mm fine wavelength.

Figure 9A:
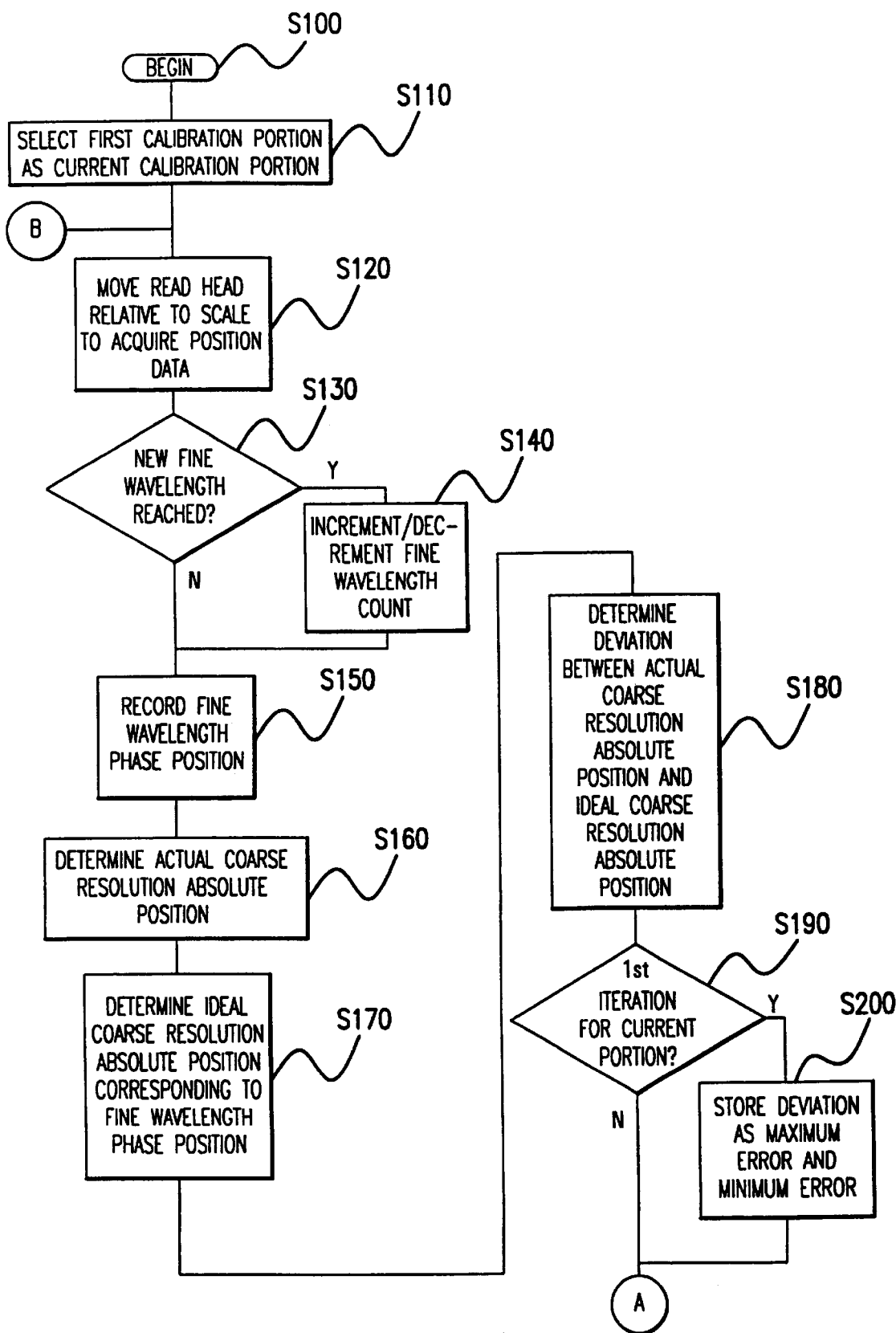
FIG. 9 is flowchart outlining one exemplary embodiment method for calibrating an absolute position encoder in accordance with this invention.
Figure 9B:
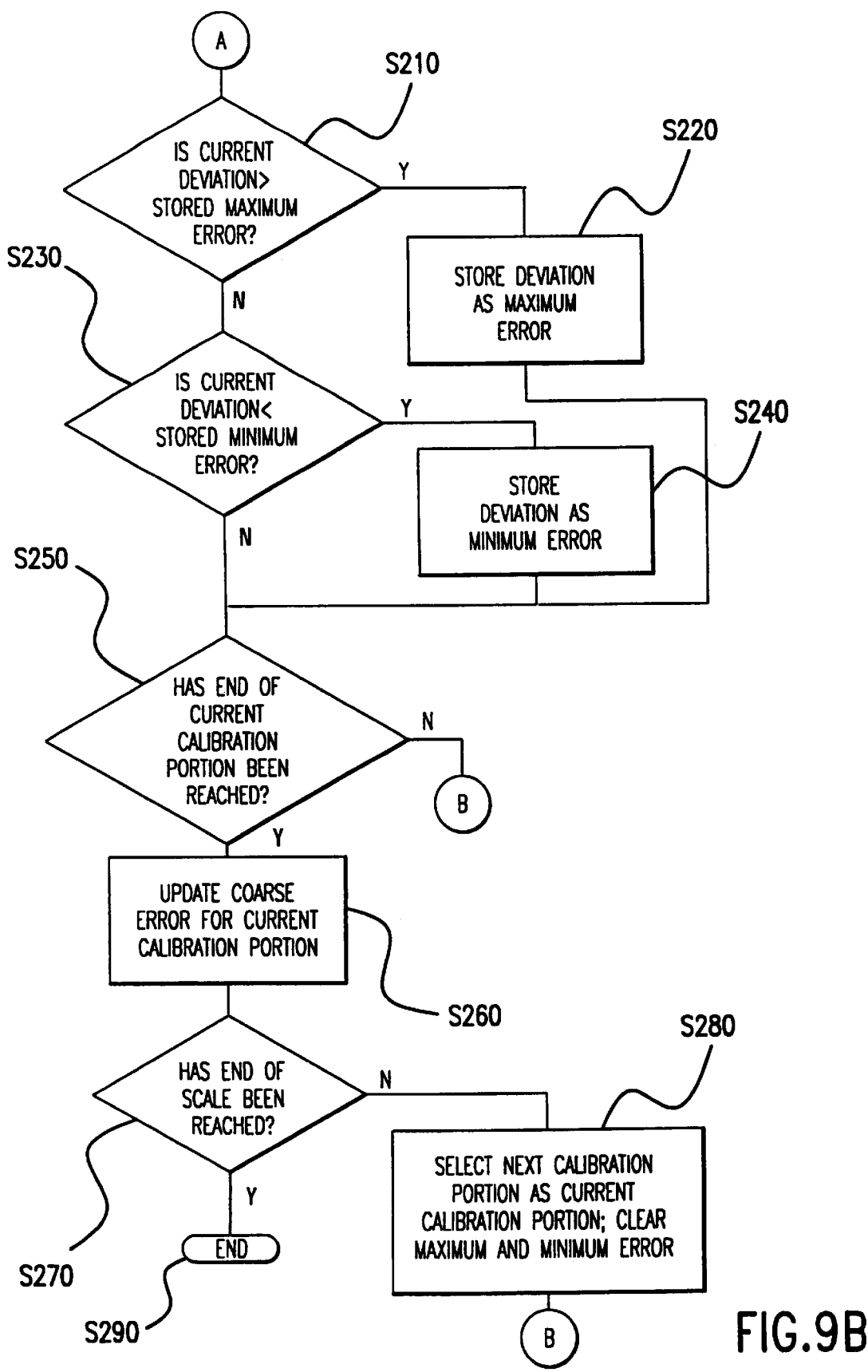

FIG. 9 is a flowchart outlining one exemplary embodiment of the methods for calibrating an absolute position encoder according to this invention. Control begins in step S100 when a calibration command is given. Then, in step S1110, the first, or only, calibration portion is selected as the current calibration portion. Next, in step S120 the read head is moved relative to the absolute position encoder scale to acquire the position data. Movement of the read head can be done under command of a computer if the encoder is built into or connected to a motion control system. It should be appreciated, however, that this calibration system also works well if the movement is not controlled by the calibration program but by any external means. For instance, in a caliper, after the calibration program has started, the caliper read head can be moved manually over the measuring range, while the calibration program collects data according to this system. The speed of movement has to be limited to a value that is related to the sampling frequency of the program. In case of external control of the movement, step 120 contains no action from the computer program, but jumps to step S130. The movement is in this case happens continuously or randomly under the external control.

In step S130, a determination is made whether a new fine wavelength has been reached. If a new fine wavelength has been reached, control continues to step S140, otherwise, control jumps to step S150.

In step S140, the fine wavelength count is incremented or decremented, dependent of magnitude and direction for the phase value change since last measurement. If the phase value has changed from a nearly maximum value, i.e., approximately 1, to near a minimum value, i.e., approximately 0, the wavelength count is incremented by one. If the phase value has changed from a nearly minimum value to a near maximum value, the wavelength count is decremented by one. Control then continues to step S150.

In step S150, the fine wavelength phase position is recorded. Alternatively, the absolute position of the read head relative to the scale based on the count of wavelength and the incremental position within a wavelength corresponding to the current phase position of the fine wavelength can be stored. Next, in step S160, the actual coarse resolution absolute position is determined. Then, in step S170, the ideal coarse resolution absolute position corresponding to the fine wavelength phase position (or absolute position) revealed in step S150 is determined. Control then continues to step S180.

In step S180, the deviation between the actual coarse resolution absolute position and the ideal coarse resolution absolute position is determined. Then, in step S190, a determination is made whether this is the first iteration for the current portion. If it is not, control jumps to step S210. Otherwise control continues to step S200. In step S200, the determined deviation is stored as both the maximum error and the minimum error. Control then optionally jumps to step S250.

In step S210, a determination is made whether the current deviation is greater than the stored maximum error. If the maximum error is greater than the stored maximum error, control continues to step S220. Otherwise, control jumps to step S230. In step S220, the current deviation is stored at the maximum error. Control then jumps to step S250.

In step S230, a determination is made whether the current deviation is less than the minimum error. If the current deviation is less than the stored minimum error, control continues to step S240. Otherwise, control jumps to step S250. In step S240, the current deviation is stored as the maximum lower error. Control then continues to step S250.

In step S250, a determination is made whether the end of the current calibration portion has been reached. If the end of the current calibration portion has not been reached, control jumps back to step S120. Otherwise, control continues to S260.

In step S260, the mean value of the stored maximum and minimum deviations is stored in the look-up table as the coarse error for the current calibration portion. Then, in step S270, a determination is made whether the end of the scale has been reached. If the end of the scale has not been reached, control continues to step S280. Otherwise, control jumps to step S290, where the control sequence ends. In step S280, the new current calibration portion is set and the maximum error and minimum error values are cleared. Thereafter control jumps back to S120.

As shown in FIG. 5, the absolute position encoder calibration system is preferably implemented either on a programmed microprocessor or microcontroller and peripheral integrated circuit elements. However, the absolute position encoder calibration system can also be implemented on a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the flowchart shown in FIG. 9 can be used to implement the absolute position encoder calibration system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An absolute position encoder comprising a read head member and a scale member, the absolute position encoder having at least two position determining modes, a relatively fine resolution mode exhibiting a fine wavelength, and a relatively coarse resolution mode for identifying absolute position over more than one increment of the fine wavelength, the absolute position encoder correcting the coarse resolution mode position values using at least one correction value derived from at least one cumulative position value, the at least one cumulative position value derived from the fine resolution mode.

2. The absolute position encoder according to claim 1, wherein the at least one correction value is derived from data obtained while moving the read head member over the scale member and continuously reading the coarse resolution mode position values and the at least one cumulative position value derived from the fine resolution mode.

3. The absolute position encoder according to claim 2, wherein the at least one correction value is further derived by determining a maximum value and a minimum value of the difference between the coarse resolution mode position value and the at least one cumulative position value derived from the fine resolution mode over at least one selected interval, and storing the mean of the maximum and minimum values as a correction value for each interval in a memory and, during regular measurement, correcting the coarse mode position measurement with the stored correction value for the interval corresponding to the current position.

4. An absolute position encoder according to claim 3, in which the at least one interval is the full range of the absolute encoder and one correction value is used for the full range.

5. An absolute position encoder according to claim 3, wherein the at least one interval comprises N intervals, each interval extending over 1/N of the absolute encoder range and each interval having a corresponding correction value.

6. A caliper with an absolute encoder according to claim 1, wherein a control routine for deriving the coarse value correction is incorporated into an internal electronic circuit of the caliper.

7. The caliper of claim 6, wherein the coarse value correction deviation control routine is activated by the user and at least one correction value is obtained by a manually moving the read head member over the scale member.

8. The caliper of claim 7, wherein the read head is manually moved over one of the full range of the caliper and a part of the range of the caliper.

9. A method of calibrating at least a portion of an absolute position encoder having a fine resolution mode and a coarse resolution mode comprising:

determining at least one cumulative position value based on the fine resolution mode;

determining at least one correction value based on the at least one cumulative position value; and updating a coarse resolution mode position value based on the at least one correction value.

10. The method of claim 9, wherein determining the at least one correction value further comprises:

moving a read head member relative to a scale member; and determining a difference between the coarse resolution mode position value and the at least one cumulative position value.

11. The method of claim 10, wherein determining the at least one correction value further comprises:

determining a maximum value and a minimum value of the difference between the coarse resolution mode position value and the at least one cumulative position value over a selected interval;

storing the mean of the maximum value and the minimum value as the correction values for the selected interval.

12. The method of claim 9, wherein determining the cumulative position value comprises:

moving a read head member relative to a scale member; and incrementing a fine wavelength count each time a new fine wavelength is encountered.

13. The method of claim 9, further comprising repeating the determining and repeating steps until a desired portion of the absolute position encoder has been calibrated.

14. The method of claim 13, wherein one correction value is used to calibrate the entire absolute position encoder.

15. The method of claim 9, wherein the fine resolution mode is based on a fine wavelength, and the coarse resolution mode identifies an absolute position over more than one increment of the fine wavelength.

* * * * *